United States Patent [19]

Fujita

[11] Patent Number: 5,210,535
[45] Date of Patent: May 11, 1993

[54] O S I DATA COMMUNICATION FOR DEALING WITH ABSTRACT SYNTAXES WHICH ARE AND ARE NOT PRELIMINARILY NEGOTIATED

[75] Inventor: Tomoo Fujita, Tokyo, Japan

[73] Assignee: NEC Corporation, Tokyo, Japan

[21] Appl. No.: 654,975

[22] Filed: Feb. 14, 1991

[30] Foreign Application Priority Data

Feb. 14, 1990 [JP] Japan .................................. 2-35008

[51] Int. Cl.⁵ ............................................. H03M 7/00
[52] U.S. Cl. ........................................ 341/51; 341/55;
395/118; 395/200
[58] Field of Search ............................ 341/50, 51, 55;
364/900, 943; 395/118, 200

[56] References Cited

U.S. PATENT DOCUMENTS 4,994,998 2/1991 Anezaki ............................... 364/900

Primary Examiner—Todd E. DeBoer
Assistant Examiner—Brian Young
Attorney, Agent, or Firm—Foley & Lardner

[57] ABSTRACT

Being operable as a presentation layer defined by the International Standard ISO 7498, each data communication system comprises (A) a syntax transforming unit and (B) an abstract syntax storing unit besides (a) an application program unit for producing and receiving abstract syntaxes descriptive of data according to the International Standard ISO 8824 and (b) a sending and receiving unit for sending and receiving trasfer syntaxes to and from at least one counterpart system. Before carrying out data transfer, negotiation is had in the known manner to decide a set of abstract syntaxes, which can be used in the data transfer and are herein called negotiated syntaxes and encoded by the transforming unit into primary transfer syntaxes as herein called with these transfer syntaxes accompanied by first information. The application program unit may produce different syntaxes which are the abstract syntaxes other than the negotiated syntaxes. Even in this event, the transforming unit encodes the different syntaxes into what are herein called secondary transfer syntaxes with these transfer syntaxes accompanied by second information. When supplied with each secondary transfer syntax and the second information from the counterpart system, the storing unit stores the second information in the transforming unit. This enables the transforming unit to refer to the second information like usual reference to the first information and to decode the secondary transfer syntax in question into a reproduction of one of the different syntaxes that is used in the counterpart system.

5 Claims, 1 Drawing Sheet

O S I DATA COMMUNICATION FOR DEALING WITH ABSTRACT SYNTAXES WHICH ARE AND ARE NOT PRELIMINARILY NEGOTIATED

BACKGROUND OF THE INVENTION

This invention relates to data communication between presentation layers which are defined according to open systems interconnection (OSI) standardized by the International Organization for Standardization (ISO).

A first or lowest layer through a seventh or highest layer are defined by the International Standard ISO 7498 "Information Processing Systems—Open Systems Interconnection—Basic Reference Model". The presentation layer is the sixth layer, on which an application layer lies as the seventh layer.

In the manner which will later be described more in detail, a presentation protocol machine (PPM) is a data communication system operable to function as the presentation layer and may be called a first data communication system. The data communication system comprises an application program unit for producing and accepting data represented by abstract syntaxes and a sending or transmitting and receiving unit for sending and receiving data through a communication line of an open systems interconnection network including at least one counterpart presentation protocol machine that may be called a second data communication system. In the communication line, the data are represented by transfer syntaxes. In the presentation protocol machine, the abstract syntaxes are encoded into the transfer syntaxes for sending to the communication line. When received, the transfer syntaxes are decoded into the abstract syntaxes.

Before supply to the communication line, the data are represented as the abstract syntaxes according to the International Standard ISO 8824 "Information Processing Systems—Open Systems Interconnection—Specification of Abstract Syntax Notation One (ASN. 1)". In general, each abstract syntax is defined in connection with an individual function, such as an abstract syntax for use in file transfer, and is given an abstract syntax name. Such abstract syntax names are administered by an international organization for registration or a registration authority (RA) so as to be unequivocal.

Each data communication system is preliminarily informed of either all the abstract syntax names or at least a part of the abstract syntax names. Before the first data communication system transmits or receives the data to or from the second data communication system, negotiation is had between operators of the first and the second data communication systems as regards the abstract syntaxes to decide a set of abstract syntaxes which should be used in data transfer.

After the negotiation, the first data communication system encodes the abstract syntaxes into the transfer syntaxes and transmits the transfer syntaxes towards the second data communication system with information attached before each transfer syntax to specify its abstract syntax name. After the negotiation, the first data communication system receives like transfer syntaxes from the second data communication system together with similar information preceding each transfer syntax and decodes the transfer syntaxes into the abstract syntaxes according to the similar information.

Inasmuch as the data transfer is carried out in this manner between at least two conventional data communication systems, the negotiation has been indispensable before the data transfer between the first and the second data communication systems to decide abstract syntaxes of a set for use in the data transfer. In other words, the first data communication system has been unable to transmit the data to the second data communication system unless the data can be described as abstract syntaxes of at least one definition that the second data communication system is aware of prior to the data transfer.

From a different point of view, a method out communication between at least two presentation layers defined by open systems interconnection standardized by the International Organization for Standardization and is for use in each of the presentation layers. A conventional method of the type described, include the steps of producing abstract syntaxes descriptive of data to be transmitted, negotiating between the above-mentioned each of the presentation layers and a different one of the presentation layers as regards the abstract syntaxes to decide a set of abstract syntaxes as negotiated syntaxes, encoding the negotiated syntaxes into transfer syntaxes with the transfer syntaxes accompanied by information indicative of the negotiated syntaxes, and sending or transmitting the transfer syntaxes to the different presentation layer together with the information.

In this manner, the conventional data communication method can deal with the negotiated syntaxes, which are preliminarily negotiated ones of the abstract syntaxes. The conventional method is, however, incapable of dealing with other abstract syntaxes, for which the negotiation is not preliminarily completed

SUMMARY OF THE INVENTION

It is therefore an object of the present invention to provide a method for carrying out data communication between presentation layers defined by open systems interconnection standardized by the International Organization for Standardization and which can deal with preliminarily negotiated abstract syntaxes as well as other abstract syntaxes which are not preliminarily negotiated.

It is another object of this invention to provide a data communication system which is operable according to open systems interconnection standardized by the International Organization for Standardization as a presentation layer and which can deal with preliminarily negotiated abstract syntaxes as well as different abstract syntaxes which are not preliminarily negotiated.

Other objects of this invention will become clear as the description proceeds.

On describing the gist of an aspect of this invention, it is possible to understand that a method for carrying out data communication between presentation layers defined by open systems interconnection standardized by the International Organization for Standardization is for use in each of the presentation layers and includes the steps of producing abstract syntaxes, negotiating between the above-mentioned each of the presentation layers and a different one of the presentation layers to decide a set of abstract syntaxes as negotiated syntaxes, encoding the negotiated syntaxes into primary transfer syntaxes with the primary transfer syntaxes accompanied by first information indicative of the negotiated syntaxes, and sending the primary transfer syntaxes to the different presentation layer together with the first information.

According to the above-described aspect of this invention, the above-understood method comprises the step of storing the first information as memorized information. In this aspect of this invention, the encoding step is for encoding, with reference to the memorized information, different syntaxes into secondary transfer syntaxes with the secondary transfer syntaxes accompanied by second information indicative of the different syntaxes, where the different syntaxes are included in the abstract syntaxes besides the negotiated syntaxes. In the aspect of this invention being described, the sending step is for additionally sending the secondary transfer syntaxes to the different one of the presentation layers together with the second information.

On describing a different aspect of this invention, it is possible to understand that a data communication system is operable according to open systems interconnection stardardized by the International Organization for Standardization as a presentation layer and includes an application program unit and sending and receiving means for sending and receiving data as transfer syntaxes through a communication line.

According to the different aspect of this invention, the above-understood data communication system comprises (A) syntax transforming means for carrying out transform between abstract syntaxes descriptive of the data and the transfer syntaxes and (B) abstract syntax storing means connected to the sending and receiving means and the syntax transforming means for storing in the syntax transforming means the abstract syntaxes which are produced for sending to the communication line and are received through the communication line.

BRIEF DESCRIPTION OF THE DRAWING

The single figure is a block diagram of a data communication system according to an embodiment of the instant invention.

DESCRIPTION OF THE PREFERRED EMBODIMENT

Figure 1:
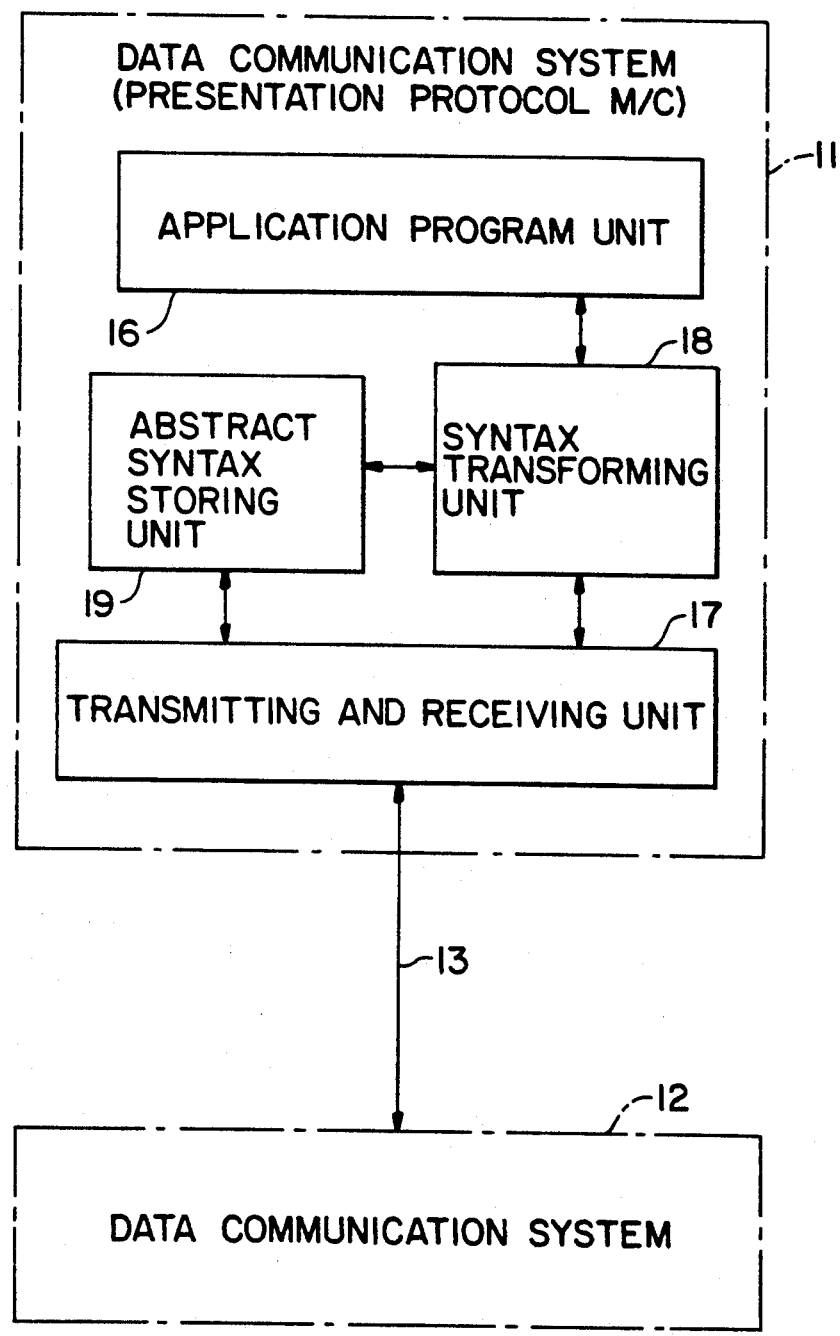

Referring to the sole figure, a data communication system 11 is a presentation protocol machine operable to function as a presentation layer defined by the International Standard ISO 7498 "Information Processing Systems—Open Systems Interconnection—Basic Reference Model". The data communication system 11 is included in an open systems interconnection network as a first data communication system. The open systems interconnection network comprises a counterpart data communication system 12 which is herein called a second data communication system and is connected to the first data communication system 11 through a data communication line 13.

In the manner known in the art, each data communication system 11 or 12 includes an application program unit 16 for producing and accepting or receiving data which should be transmitted to the communication line 13 and are received through the communication line 13 from a different one of the first and the second data communication systems 11 and 12. The data are described as abstract syntaxes according to the International Standard ISO 8824 "Information Processing Systems—Open Systems Interconnection—Specification of Abstract Syntax Notation One (ASN. 1)". It should be noted that such an elementary part is depicted only in the first data communication system 11 and that the second data communication system 12 comprises similar elementary parts (not shown).

A sending or transmitting and receiving unit (Tx-Rx) 17 is connected to the communication line 13 and is for transmitting and receiving data through the communication line 13. At this stage of operation of the first and the second data communication systems 11 and 12, the data are described as transfer syntaxes.

According to a preferred embodiment of the present invention, a syntax transforming unit 18 is connected to the application program unit 16 and the sending and receiving unit 17. The syntax transforming unit 18 is primarily for carrying out transformations between each abstract syntax and each transfer syntax. That is, the syntax transforming unit 18 primarily encodes the abstract syntaxes into the transfer syntaxes and decodes the transfer syntaxes into the abstract syntaxes.

An abstract syntax storing unit 19 is connected to the sending and receiving unit 17 and the syntax transforming unit 18. In the manner which will become clear as the description proceeds, the abstract syntax storing unit 19 stores, in the syntax transforming unit 18, the abstract syntaxes which are produced by the application program unit 16 for sending to the communication line 13 and are received through the communication line 13 from the different one of the first and the second data communication systems 11 and 12.

At this stage of the description, attention will be directed to a conventional presentation protocol machine which is a data communication system of the type being described. In the conventional data communication system, each abstract syntax is encoded into a transfer syntax like in each data communication system 11 or 12. Each transfer syntax is decoded into an abstract syntax.

The conventional presentation protocol machine sends or transmits the transfer syntaxes to at least one counterpart presentation protocol machine with each transfer syntax preceded by syntax information indicative of an abstract syntax name which is given to the abstract syntax encoded into the transfer syntax in question. It has been indispensable, in order to enable the counterpart machine to decode the transfer syntaxes into abstract syntaxes, that such syntax information be preliminarily known to the counterpart machine.

Negotiation is therefore had as regards the abstract syntaxes between operators of the respective presentation protocol machines so as to decide a set of abstract syntaxes which should be used in data transfer. In other words, it has been impossible to carry out the data transfer to the counterpart presentation protocol machine unless the counterpart presentation protocol machine is preliminarily aware of the abstract syntaxes which may be used in the data transfer.

The negotiation is had also between operators of each of the first and the second data communication systems 11 and 12 and a different one of the dat communication systems 11 and 12. During the negotiation which is carried out in the manner which will presently be pointed out, the first data communication system 11 becomes aware of a set of abstract syntaxes into which the second data communication system 12 can decode the transfer syntaxes transmitted from the first data communication system 11 through the data communication line 13. The abstract syntaxes of such a set are herein called negotiated syntaxes. Information related to the negotiated syntaxes is stored as syntax or first information by the abstract syntax storing unit 19 in the syntax transforming unit 18.

After the negotiation, the first data communication system 11 can carry out the data transfer by using the negotiated syntaxes to the second data communication system 12. More particularly, the application program unit 16 delivers the abstract syntaxes to the syntax transforming unit 18 in which the first information is stored during the negotiation as memorized information. If supplied with the abstract syntaxes related to the memorized information, the syntax transforming unit 18 delivers the memorized information to the sending and receiving unit 17. This information may again be called first information. Subsequently, the syntax transforming unit 18 encodes the negotiated syntaxes into transfer syntaxes which are herein called primary transfer syntaxes. Supplied with the primary transfer syntaxes from the syntax transforming unit 18, the sending and receiving unit 17 transmits the first information and the primary transfer syntaxes to the communication line successively or in cancatenation.

It is possible that no memorized information is found in the syntax transforming unit 18 in connection with some of the abstract syntaxes supplied from the application program unit 16. Such abstract syntaxes are herein named different syntaxes for discrimination from the negotiated syntaxes. In other words, the different syntaxes are included, in addition to the negotiated syntaxes, in the abstract syntaxes produced by the application program unit 16. The syntax transforming unit 18 may encode the different syntaxes into transfer syntaxes which are herein called secondary transfer syntaxes and are discriminated from the primary transfer syntaxes into which the negotiated syntaxes are encoded. The sending and receiving unit 17 may transmit towards the second data communication system 12 such secondary transfer syntaxes. The second data communication system 12 is, however, unaware of how to decode the secondary transfer syntaxes into abstract syntaxes for acceptance by the application program unit of the second data communication system 12.

In the example being illustrated, the syntax transforming unit 18 supplies in such an event the abstract syntax storing unit 19 with information which is herein called second information and defines at least one definition given to the different syntaxes. The abstract syntax storing unit 19 delivers the second information to the sending and receiving unit 17 as a datum which should be transmitted to the communication line 13. Subsequently, the syntax transforming unit 18 encodes the different syntaxes into the secondary transfer syntaxes and delivers the secondary transfer syntaxes to the sending and receiving unit 17. The datum and the secondary transfer syntaxes are sent to the communication line 13 successively or as a concatenation.

When successively transmitted, the primary and the secondary transfer syntaxes are sequenced according to the order of production of the negotiated and the different syntaxes by the application program unit 16. The first and the second information precedes each primary transfer syntax and each secondary transfer syntax, respectively. It is readily possible to make the sending and receiving unit 17 transmit the primary and the secondary transfer syntaxes and the first and the second information in such an order.

The negotiation is had between the first and the second data communication systems 11 and 12 by first sending the primary transfer syntaxes, for example, from the first data communication system 11 to the second data communication system 12, together with the first information. The primary transfer syntaxes and the first information may collectively be called a first transmission datum. Received at the second data communication system 12, the first information of the first transmission datum is stored in the syntax transforming unit, such as 18. Subsequently, like primary transfer syntaxes and similar first information are sent from the second data communication system 12 to the first data communication system 11 collectively as a second transmission datum. Received at the first data communication system 11, the first information of the second transmission datum is stored in the syntax transforming unit 18 as the stored information. The first information stored in the second data communication system 12, may be referred to also as memorized information. After the negotiation, definitions of the negotiated syntaxes are thus stored in the syntax transforming units, such as 18, in a common fashion.

From the above, it is understood that a data communication method is for use in each of a plurality of presentation layers, such as 11 and 12, defined by open systems interconnection stardardized by the International Standard ISO 7498 and inludes the steps of producing by the application program unit, such as 16, abstract syntaxes descriptive of data for transmission according to the International Standard ISO 8824, negotiating between the presentation layer under consideration and a different one of the presentation layers as regards the abstract syntaxes to decide a set of abstract syntaxes as negotiated syntaxes, encoding by the syntax transforming unit, such as 18, the negotiated syntaxes into primary transfer syntaxes with the primary transfer syntaxes accompanied by first information indicative of at least one definition given to the negotiated syntaxes, and sending the primary transfer syntaxes to the different one of the presentation layers together with the first information successively or in concatenation.

In the example so far described, the data communication method comprises the step of storing the first information as memorized information in the syntax transforming unit. The encoding step is for encoding, with reference to the memorized information, different syntaxes into secondary transfer syntaxes with the secondary transfer syntaxes accompanied by second information indicative of at least one definition given to the different syntaxes, where the different syntaxes are included besides the negotiated syntaxes in the abstract syntaxes produced by the application program unit. The sending step is for additionally sending the secondary transfer syntaxes towards the different one of the presentation layers together with the second information successively or in concatenation.

It will now be assumed that the first data communication system 11 receives the primary and the secondary transfer syntaxes and the first and the second information from the second data communication system 12 through the data communication line 13. When received in this manner, the primary and the secondary transfer syntaxes and the first and the second information will be called primary and secondary received syntaxes and first and second received information.

Supplied with the first received information and each primary received syntax from the communication line 13, the sending and receiving unit 17 refers to the syntax transforming unit 18 and knows that the first received information is stored in the syntax transforming unit 18 as the memorized information. The sending and receiving unit 17 delivers the primary transfer syntax under consideration to the syntax transforming unit 18. In accordance with the memorized information, the syntax transforming unit 18 decodes this primary received syntax into a primary decoded syntax which is a reproduction of one of the negotiated syntaxes that is encoded into the primary transfer syntax received as the primary received syntax in question. The syntax transforming unit 18 delivers the primary decoded syntax to the application program unit 16.

When supplied with the second received information and each secondary received syntax from the communication line 13, the sending and receiving unit 17 knows by referring to the syntax transforming unit 18 that the second received information is not stored in the syntax transforming unit 18. In this event, the sending and receiving unit 17 delivers the second received information to the abstract syntax storing unit 19 to make the abstract syntax storing unit 19 store the second received information in the syntax transforming unit 18 as an additional datum. Thereafter, the sending and receiving unit 17 delivers the secondary received syntax in question to the syntax transforming unit 18. Inasmuch as the additional datum indicates the definition of an abstract syntax, the syntax transforming unit 18 can decode this secondary received syntax into the abstract syntax under consideration. This abstract syntax will be called secondary decoded syntax. The syntax transforming unit 18 delivers the secondary decoded syntax to the application program unit 16.

Reviewing the illustration with reference to the single figure, it is understood that the above-described data communication method further includes the steps of receiving the primary transfer syntaxes and the first information at the sending and receiving unit 17 from the different one of the presentation layers as primary received syntaxes and first received information and decoding by the syntax transforming unit 18 the primary received syntaxes with reference to the first received information into primary decoded syntaxes which are reproductions of the negotiated syntaxes used in the different one of the presentation layers.

In the example illustrated with reference to the sole figure, the receiving step is for additionally receiving the secondary transfer syntaxes and the second information from the different one of the presentation layers as secondary received syntaxes and second received information. The decoding step is for additionally decoding the secondary receivecd syntaxes with reference to the second received information into secondary decoded syntaxes which are reproductions of the different syntaxes used in the different one of the presentation layers.

The data communication method may further comprise the step of memorizing the second received informatin in the syntax transforming unit 18 as additional data in addition to the memorized information.

Again reviewing the sole figure, it is understood that a data communication system 11 is operable as a presentation layer defined by the International Standard ISO 7498 and includes (a) an application program unit 16 for producing and accepting abstract syntaxes which describes data for transmission according to the International Standard ISO 8824 and (b) a sending and receiving unit 17 for sending and receiving the data as transfer syntaxes through a communication line 13.

In the example illustrated with reference to the single figure, the above-understood data communication system comprises (A) a syntax transforming unit 18 for carrying out transform between the abstract syntaxes and the transfer syntaxes and (B) an abstract syntax storing unit 19 connected to the sending and receiving unit 17 and the syntax transforming unit 18 for storing in the syntax transforming unit 18 information related to the abstract syntaxes which are produced by the application program unit 16 and are received through the comnmunication line 13.

It should be noted in connection with the above that an operator of either the application program unit 16 or the application layer (not shown) may try to carry out the data transfer by using the different syntaxes mentioned above. In other words, the operator may desire to use abstract syntaxes which are either not included in the set of abstract syntaxes decided by the negotiation or are not yet defined by the registration authority. Even in such an event, this invention makes it unnecessary for the operator to care for results of the negotiation.

While this invention has thus far been described in specific conjunction with only one preferred embodiment thereof, it will now be readily possible for one skilled in the art to carry this invention into effect in various other manners. For example, a mark may be placed before the second information which precedes each of the secondary transfer syntaxes. Such a mark is preferred because the mark makes it unnecessary for the sending and receiving unit 17 refere to the syntax transforming unit 18 as regards the memorized information. More specifically, the sending and receiving unit 18 can know that the information is the first and the second information when the information under consideration does not and does immediately follow the mark.

What is claimed is:

1. A method of carrying out data communication between presentation layers defined by open systems interconnection standardized by the International Organization for Standardization, said method being for use in each of said presentation layers and including the steps of:

producing abstract syntaxes;

negotiating between each of said presentation layers and a different one of said presentation layers to decide a set of abstract syntaxes as negotiated syntaxes;

encoding said negotiated syntaxes into primary transfer syntaxes with said primary transfer syntaxes accompanied by first information indicative of said negotiated syntaxes;

sending said primary transfer syntaxes to said different one of said presentation layers together with said first information;

storing in a memory said first information as memorized information;

said encoding step being for encoding, with reference to said memorized information, different syntaxes into secondary transfer syntaxes with said secondary transfer syntaxes accompanied by second information indicative of said different syntaxes, said different syntaxes being included in said abstract syntaxes besides said negotiated syntaxes; and said sending step being for additionally sending said secondary transfer syntaxes to said different one of the presentation layers together with said second information.

2. A method as claimed in claim 1, said method further including the steps of:

receiving said primary transfer syntaxes and said first information from said different one of said presentation layers as primary received syntaxes and first received information and decoding said primary received syntaxes into primary decoded syntaxes with reference to said first received information, said primary decoded syntaxes being reproductions of said negotiated syntaxes used in said different one of said presentation layers, wherein:

said receiving step is for additionally receiving said secondary transfer syntaxes and the second information from said different one of said presentation layers as secondary received syntaxes and second received information;

said decoding step being for additionally decoding said secondary received syntaxes into secondary decoded syntaxes with reference to said second received information, said secondary decoded syntaxes being reproductions of said different syntaxes used in said different one of said presentation layers.

3. A method as claimed in claim 2, wherein said memorizing step is for additionally storing said second received information in addition to said memorized information.

4. A method as claimed in claim 1, wherein said sending step is for sending a mark before only the second information preceding each of said secondary transfer syntaxes.

5. A data communication system which is operable according to open systems interconnection standardized by the International Organization for Standardization as a presentation layer and includes an application program unit and sending and receiving means for sending and receiving data as transfer syntaxes through a communication line and which comprises:

syntax transforming means for carrying out transforms between syntaxes descriptive of said data and said transfer syntaxes; and abstract syntax storing means connected to said sending and receiving means and said syntax transforming means for storing in said syntax transforming means said abstract syntaxes which are produced for sending to said communication line and are received through said communication line.

* * * * *